United States Patent Office 3,484,429
Patented Dec. 16, 1969

3,484,429
PROCESS FOR PRODUCING NITROGEN, SULFUR OR IN ADDITION OXYGEN CONTAINING COMPOSITIONS AND PRODUCTS THEREOF
William M. Le Suer, Cleveland, Ohio, assignor to The Lubrizol Corporation, Wickliffe, Ohio, a corporation of Ohio
No Drawing. Original application Nov. 10, 1964, Ser. No. 410,289, now Patent No. 3,347,792. Divided and this application Dec. 14, 1966, Ser. No. 601,554
Int. Cl. C07g 17/00; C10m 7/36; C08c 11/54
U.S. Cl. 260—132
15 Claims

ABSTRACT OF THE DISCLOSURE

Nitrogen- and sulfur-containing or in addition oxygen containing compositions are prepared by the process comprising reacting a mixture of a compound selected from the class consisting of ammonia, primary amines and secondary amines, about an equivalent amount of carbon disulfide and at least about an equivalent amount of an epoxide or thio-epoxide. All three reactants are believed to be involved in a condensation reaction. The products of the process are used to impart load carrying properties to lubricants.

---

This application is a division of copending application Ser. No. 410,289, filed Nov. 10, 1964; now U.S. Patent 3,347,792.

The present invention relates to a process for the preparation of nitrogen- and sulfur-containing or in addition oxygen containing compositions and to the products of the process.

The nitrogen- and sulfur-containing acidic compositions obtained by reacting primary or secondary amines with carbon disulfide are, by themselves, relatively unstable, usually decomposing at temperatures above about 5° C. The alkali metal or alkaline earth metal salts and other derivatives of such compositions, however, are much more stable and are useful in such diverse fields as lubricant additives, rubber vulcanization accelerators, rubber oxidation inhibitors, enzyme inhibitors, metal chelating agents, medicinals, insecticides, fungicides, and rodent repellants.

It is an object of the present invention to provide a novel process for the preparation of nitrogen- and sulfur-containing or in addition oxygen containing compositions.

It is also an object of the present invention to provide a process for the preparation of neutral, nitrogen- and sulfur-containing or in addition oxygen containing compositions.

It is also an object of the present invention to provide a process for the preparation of acidic, nitrogen- and sulfur-containing or in addition oxygen containing compositions.

It is a further object to provide nitrogen- and sulfur-containing or in addition oxygen containing compositions.

It is a still further object to provide lubricating compositions.

Other objects of the invention will become apparent from the following detailed description thereof.

These objects are accomplished by the process of preparing nitrogen- and sulfur-containing or in addition oxygen containing compositions comprising reacting, at a temperature of from about $-50°$ C. to about 100° C., a compound selected from the class consisting of ammonia, primary amines and secondary amines with about an equivalent amount of carbon disulfide and at least about an equivalent amount of an epoxide or thio-epoxide.

The amine reactant may be either a primary or secondary amine represented by the structural formula:

in which $R_1$ and $R_2$ may be the same or different radicals. For example, $R_1$ and $R_2$ may be hydrogen, alkyl, cycloalkyl, aralkyl, aryl, alkaryl or aminoalkyl. It is intended that $R_1$ and $R_2$ embrace hydrocarbon radicals and substituted hydrocarbon radicals containing polar substituents such as halo, nitro, ether, or ester groups which do not interfere with the reaction of the process of this invention and which are not present in such proportions in the radical as to alter significantly the hydrocarbon character of the radical. In most cases there should be no more than one or two such polar groups per hydrocarbon radical. Especially useful amines are those having up to about 30 carbon atoms in each $R_1$ and $R_2$.

Amines are also contemplated in which $R_1$ and $R_2$ together represent a bivalent radical such as an alkylene group attached to the nitrogen atom. Such amines are exemplified by heterocyclic secondary amines.

It is also intended to include aminoalkyl-substituted amines such as alkylene polyamines in which the alkylene group contains from two to about eight carbon atoms. Such polyamines may contain from one to about ten alkylene groups and up to about eleven amino groups at least one of which is primary or secondary.

Specific illustrative examples of the amines contemplated herein are shown by the following:

(1) Mono alkyl amines including methylamine, ethylamine, propylamine, isopropylamine, n-butylamine, sec-butylamine, isobutylamine, pentylamines, hexylamines, cyclohexylamines, heptylamines, octylamines, dodecylamines octadecylamines, eicosylamines, triacontanylamines, benzylamine, chlorobenzylamine, nitrobenzylamine, 2-ethoxyethylamine, 4-carbomethoxy-hexylamine, etc.

(2) Di-alkyl amines including dimethylamine, diethylamine, di-n-propylamine, diisopropylamine, di-n-butylamine, di-sec-butylamine, diisobutylamine, di-tert-butylamine, dipentylamines, dihexylamines, dioctylamines, ditriacontanylamine, N-methylethylamine, N-methyl-propylamine, N-methyl-octadecylamine, N-ethylhexylamine, N-ethyl-dodecylamine, N-propyl-dodecylamine, etc.

(3) Heterocyclic aliphatic secondary amines including piperidine, pyrrole, imidazoline, pyrazole, piperazine, etc.

(4) Aryl amines including aniline, toluidine, anisidine, nitroaniline, bromoaniline, xylidines, 4-ethylaniline, naphthylamine, etc.

(5) Di-aryl amines including diphenylamine, N-phenyl-2-naphthylamine N-phenyl-naphthylamine, etc.

(6) Alkyl arylamine having from 1 to about 30 carbon atoms in the alkyl group attached either to the nitrogen atom or to the aryl group including N-ethylaniline, N-methyl-o-toluidine, N-methyl-p-toluidine, p-chloro-N-methylaniline, N,N'-dimethylphenylenediamine, 4-ethylaniline, 4-propylaniline, 4-butylaniline, 4-decylaniline, etc.

(7) Aminoalkyl substituted amines including ethylenediamine, diethylenetriamine, triethylenetetramine, 1,3-propylenediamine, di-1,3-propylenetriamine, 1,6-11,16-tetraazahexadecane.

The epoxides and thio-epoxides which are useful for the purposes of this invention are characterized as having the structural formula:

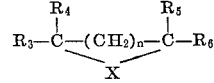

wherein X is 0 or S, $n$ is an integer from 0 to 2, and $R_3$, $R_4$, $R_5$ and $R_6$ may be hydrogen, alkyl, aralkyl, cycloalkyl, alkenyl, aryl or aralkyl. It is intended that $R_3$, $R_4$, $R_5$ and $R_6$ embrace hydrocarbon radicals containing polar substituents such as halo, nitro, ether, or ester groups which do not interfere with the reaction of the process of this invention and which are not present in such proportions in the radical as to alter significantly by the hydrocarbon character of the radical. In most cases there should be no more than one or two such polar groups per hydrocarbon radical. Those epoxides are useful which have a total of up to about 30 carbon atoms. Particularly preferred are the alkylene oxides having from 2 to about 20 carbon atoms in the alkylene group.

Specific examples of suitable epoxides incldue ethylene oxide, propylene oxide, 1,2-butylene oxide, 1,3-butylene oxide, epichlorohydrin, butadiene monoxide, cyclohexene oxide, 1,2-octylene oxide, styrene oxide, butyl 9,10-epoxystearate, 1,2-octadecylene oxide, etc.

The reaction of this process is believed to be a condensation involving all three reactants. In most instances, no by-product appears to be formed or detected. The product of the reaction appears to be a complex mixture, the exact structural composition of which is not known. It is believed, however, that the product may contain ester radicals, mercapto radicals, hydroxy radicals, or a mixture of these and other radicals. Thus, the product can best be defined in terms of the process by which it is made.

The process involves, in most cases, an exothermic reaction which is initiated readily at room temperature, e.g. about 25° C., or even below. The reaction may require external cooling of either the reaction mixture as the reaction proceeds or the reactants prior to the initiator of the reaction. It is generally advantageous to regulate the reaction temperature by the portionwise addition of one of the reactants to a mixture of the other two reactants.

The use of a solvent is frequently beneficial and is recommended, particularly in those instances where the reaction is sufficiently exothermic to require dissipation of a considerable amount of heat. Suitable solvents for such instances include, for example: petroleum ether, naphtha, dioxane, aliphatic ether, chloroform, benzene, etc. Preferably, the solvent is low boiling, e.g., boiling below about 150° C., so that it may be removed easily from the product mixture.

Inasmuch as the reaction of the process is exothermic, it may be conveniently carried out at a temperature of from about −50° C. to 100° C. In some circumstances, this temperature may be as low as −75° C. or as high as 150° C. or even higher provided that it is below the decomposition temperature of the reaction mixture and of the product. Where a solvent is present in the reaction mixture, it may be desirable to carry out the reaction at a higher temperature, e.g., above 100° C., so as to remove the solvent continuously from the reaction medium.

The reaction generally involves about equivalent amounts of the three reactants although in some instances up to about four equivalents of an epoxide may be incorporated into the product. In some instances such as where a weakly basic aryl amine is used, the reaction may be catalyzed by a base. The basic catalysts for such purposes include, for example, tertiary amines, such as triethylamine, tripropylamine, tributylamine, pyridine, lutidine, etc., and alkali metal alcoholates such as sodium methylate, sodium ethylate, sodium propylate, potassium methylate, potassium ethylate, etc. Effective catalyst concentrations generally range from about 0.1% to about 10% by weight of the amine used in the process. A particularly preferred catalyst is pyridine present at about 5% or less by weight based on the amine used in the process. An excess of any one reactant may be used and the excess may be separated from the product by any ordinary means such as evaporation or extraction.

The equivalent weight of a reactant is based on the number of the functional radicals in the molecule. Thus, for a primary or secondary monoamine the equivalent weight is the same as the molecular weight. However, for a diamine or a triamine the equivalent weight is one half or one third of the molecular weight respectively. Similarly, the equivalent weight of a monoepoxide is its molecular weight. The equivalent weight of carbon disulfide is its molecular weight.

Other details of the process of the invention are illustrated by the following examples: (all parts are by weight unless otherwise indicated)

EXAMPLE 1

To a mixture of 37 parts (0.5 equivalent) of diethylamine and 127 parts (0.5 equivalent) of a commercial, high molecular weight, aliphatic epoxide consisting essentially of a mixture of about 60% 1,2-epoxyhexadecane and about 40% 1,2-epoxyoctadecane, 3 parts (0.5 equivalent) of carbon disulfide is added in 0.33 hour. The reaction is exothermic with a temperature rise of from 25°–45° C. while the reaction vessel is cooled in a water bath. When the exothermicity subsides the reaction mixture is heated to 100° C. in 1 hour to insure complete reaction. The product is heated to 100° C. at a pressure of 30 mm. Hg and is filtered. The filtrate is a neutral product having the following analysis: 14.65% S and 3.21% N.

EXAMPLE 2

A product similar to the product of Example 1 is obtained by the procedure of Example 1 from one equivalent of carbon disulfide, one equivalent of diisopropylamine, and one equivalent of styrene oxide.

EXAMPLE 3

A product is obtained from one equivalent of carbon disulfide, one equivalent of diisopropylamine, and one equivalent of the commercial, high molecular weight, aliphatic epoxide described in Example 1 by a procedure identical to that of Example 1 except that the reaction temperature is maintained at 5° C.

EXAMPLE 4

To 774 parts (6 equivalents) of di-n-butylamine, 456 parts (6 equivalents) of carbon disulfide is added in 0.75 hour with an exothermic temperature rise of from 20°–75° C. The reaction mixture is cooled to 27° C. and 264 parts (6 equivalents) of ethylene oxide is added over a 3.75 hour period with an exothermic temperature rise to 42° C. The reaction mixture is heated to 75° C. in one hour to insure complete reaction and then is heated to 100° C. at less than 10 mm. Hg in one hour. The product is filtered. The filtered product is neutral and has the following analysis: 26.04% S and 5.5% N.

EXAMPLE 5

A nitrogen-, sulfur-, and oxygen-containing product is obtained by adding one equivalent of carbon disulfide to 2 equivalents of di-n-butylamine in 100 parts of 1,4-dioxane at 30°–40° C. in 0.33 hour, and then adding thereto one equivalent of propylene oxide in 0.33 hour at 35°–45° C. with cooling. The mixture is maintained at 25° C. for 0.5 hour and then heated to 100° C./5 mm. Hg to distill off dioxane and the unreacted dibutylamine. The product is filtered. The filtrate has the following analysis: 23.3% S and 5.2% N.

EXAMPLE 6

A product is prepared by adding, dropwise, 609 parts (8 equivalents) of carbon disulfide to a mixture of 1,034 parts (8 equivalents) of di-n-butylamine and 465 parts (8 equivalents) of propylene oxide in 2 hours while the reaction temperature is maintained at 2°–25° C. by external cooling. The mixture is kept at 25° C. for 1 hour and then heated to 70° C. A light yellow liquid product is obtained. It is heated to 100° C./10 mm. Hg and is filtered. The filtrate has the following analyses: 23.94% S and 5.3% N.

EXAMPLE 7

A clear, yellow oil is obtained when 235 parts (1.5 equivalents) of dipentylamine dissolved in 250 ml. of chloroform is added to a mixture of 114 parts (1.5 equivalents) of carbon disulfide and 87 parts (1.5 equivalents) of propylene oxide at 5°–15° C. in an ice bath. The reaction mixture is heated to 70° C. and then maintained at 70° C. for 2 hours to insure complete reaction. Solvent is removed by heating to 120° C./25 mm. Hg. The filtered product has the following analyses: 21.82% S and 4.77% N.

EXAMPLE 8

A product is obtained by the procedure of Example 1 from one equivalent of carbon disulfide, one equivalent of di-n-butyl-amine and 1 equivalent of 1,2-butylene oxide.

EXAMPLE 9

A product is obtained by the procedure of Example 7 from one equivalent of di-n-butylamine, one equivalent of carbon disulfide and one equivalent of cyclohexene oxide.

EXAMPLE 10

A product is obtained by the procedure of Example 1 from one equivalent of carbon disulfide, one equivalent of di-n-butyl-amine and one equivalent of a commercial grade butyl 9,10-epoxystearate.

EXAMPLE 11

A product is obtained by the procedure of Example 4 from one equivalent of carbon disulfide, one equivalent of dicyclohexylamine and one equivalent of propylene oxide.

EXAMPLE 12

A product is obtained by the procedure of Example 4 from one equivalent of carbon disulfide, one equivalent of dicyclohexylamine and one equivalent of ethylene sulfide.

EXAMPLE 13

A solid, yellow product having a melting point of 40°–50° C. is obtained by adding 38 grams (0.5 equivalent) of carbon disulfide to 141 grams (0.5 equivalent) of a commercially available, fatty amine having an average molecular weight of 280 (based on its nitrogen content) and consisting essentially of about 86 mole percent of octadecylamine, 12 mole percent of hexadecylamine, and 2 mole percent of heptadecylamine dissolved in a mixture of 400 grams of 1,4-dioxane and 100 grams of benzene at 25°–35° C. and then adding thereto 29 grams (0.5 equivalent) of propylene oxide at 20°–21° C. The mixture is heated slowly to 85° C. in 1.5 hours. Solvents are removed by heating the product to 100° C./30 mm. Hg and the product is filtered while hot. The filtered product solidifies upon cooling and has the following analyses: 11.0% S and 3.4% N.

EXAMPLE 14

A product is obtained by the procedure of Example 4 from one equivalent of carbon disulfide, one equivalent of N-methyl-octadecylamine dissolved in 200 parts of benzene and one equivalent of propylene oxide.

EXAMPLE 15

A product is obtained by mixing, at 25° C., 80 parts (1.05 equivalents) of carbon disulfide with 522 parts (1 equivalent) of a commercailly available, tallow amine having an average molecular weight of from 490 to 520, a nitrogen content of 2.68%–2.86%, and a melting point of 140°–148° C. dissolved in 400 parts of benzene and then adding thereto 46 parts (1.05 equivalents) of ethylene oxide at 16°–52° C. in 1.25 hours. The mixture is heated at 52°–80° C. for one hour. Benzene is removed by heating the mixture to 100° C./10 mm. Hg. The product is filtered and the filtered product is a greenish liquid having the following analyses: 10.15% S and 2.25% N.

EXAMPLE 16

A yellow liquid product is obtained by adding 80 parts by weight (1.05 equivalents) of carbon disulfide to a mixture of 522 parts (1 equivalent) of the amine of Example 15 and 61 parts (1.05 equivalents) of propylene oxide in 400 parts of benzene at 20°–25° C. The reaction mixture is heated at 75°–85° C. for 2 hours, and then to 100° C./10 mm. Hg. The product (filtrate) has the following analyses: 9.51% S and 2.21% N.

EXAMPLE 17

A clear, pale yellow oil is obtained by adding 194 parts (1.5 equivalents) of n-octylamine dissolved in 200 ml. of chloroform to a mixture of 114 parts (1.5 equivalents) of carbon disulfide and 87 parts (1.5 equivalents) of propylene oxide at 5°–10° C. an an ice bath. The mixture is then stirred at room temperature for 2 hours with the temperature rising spontaneously to 40° C. The mixture is then heated for one hour at 50°–70° C. and finally to 100° C./20 mm. Hg. The filtered product has the following analyses: 23.5% S and 5.73% N.

EXAMPLE 18

A product is prepared by the procedure of Example 7 from one equivalent of piperidine, one equivalent of carbon disulfide and one equivalent of octylene oxide.

EXAMPLE 19

To a mixture of 107 parts by weight (1 equivalent) of N-methylaniline, 76 parts (1 equivalent) of carbon disulfide, and 58 parts (1 equivalent) or propylene oxide there is added 5 parts (4.7% based on N-methylaniline) of pyridine. The reaction mixture is heated at 45°–48° C. for 2.5 hours, allowed to stand overnight at room temperature, then heated to 100° C./20 mm. Hg and finally to 85° C./0.25 mm. Hg. The product is filtered and the filtered product is neutral having the following analyses: 24.69% S and 6.01% N.

EXAMPLE 20

To a mixture of 186 parts by weight (2 equivalents) of aniline, 152 parts (2 equivalents) of carbon disulfide, and 5 parts (2.7% based on aniline) of pyridine there is added 116 parts (2 equivalents) of propylene oxide at 22°–26° C. The reaction is exothermic with a temperature rise of from 40° C. to 110° C. The reaction mixture is heated for one hour at 90°–100° C. to insure complete reaction and then to 110° C./20 mm. Hg. The product is filtered. The filtered product is neutral and has the following analyses: 26.15% S and 6.76% N.

EXAMPLE 21

A product is prepared by the procedure of Example 20 from one equivalent of diphenyl amine, one equivalent of carbon disulfide, one equivalent of propylene oxide, and 5% (based on the weight of diphenyl amine) of pyridine.

EXAMPLE 22

A product is obtained by the procedure of Example 20 from one equivalent of cumidine (p-isopropylaniline), one equivalent of carbon disulfide, one equivalent of propylene oxide, and 5% by weight (based on cumidine) of pyridine.

EXAMPLE 23

A product is obtained by the procedure of Example 7 from one equivalent of dipentylamine, one equivalent of carbon disulfide, and one equivalent of epichlorohydrin.

EXAMPLE 24

A product is obtained when one mole (2 equivalents) of ethylenediamine is added dropwise to a mixture of 2 equivalents of carbon disulfide and 2 equivalents of propylene oxide.

EXAMPLE 25

A clear yellow liquid product is obtained by introducing at 0°–15° C., 34 parts (2 equivalents) of ammonia gas to 76 parts (one equivalent) of carbon disulfide in 300 parts of 1,4-dioxane in 1.5 hours in an ice bath and then adding thereto 58 parts (1 equivalent) of propylene oxide at 15°–17° C. in 10 minutes. An additional 100 parts of dioxane is added and the mixture is stirred an additional one hour at 10°–15° C. After it is allowed to stand overnight at room temperature (25° C.), the product mixture is heated for 12 hours at 30°–35° C. and then to 35° C./0.4 mm. Hg to remove the solvent. The product is filtered and the filtered product has the following analyses: 37.84% S and 10.3% N.

When a product in the foregoing examples is said to be a "neutral" product, it is intended to indicate that the product is essentially neutral, that is, having an acid number or a base number of less than about 10 as determined by titration to a phenolphthalein end point.

The nitrogen- and sulfur-containing or in addition oxygen containing compositions of this invention are useful for a variety of purposes. They are useful, for example, as insecticides, fungicides, oxidation inhibitors, and intermediates for the preparation of other useful nitrogen-, sulfur-, and oxygen-containing compositions.

A composition which is intended for use as a lubricant additive must, of course, be soluble in the lubricating oil to a degree at least commensurate with its intended use. It has been found that a nitrogen- and sulfur-containing or in addition oxygen containing compositions prepared by the process of the present invention, in order to have the desired degree of oil solubility, should be made from a combination of reactants which together contain a total of at least about 12 aliphatic carbon atoms and up to about a total of 75 or more aliphatic carbon atoms. These include the carbon atoms contributed to the complex composition by alkyl groups from the amine and/or from the epoxide as well as the carbon atom of the carbon disulfide. For instance, the product derived from the process of reacting equivalent amounts of dipentyl amine, carbon disulfide and propylene oxide (Example 7), has a total of 14 aliphatic carbon atoms and is oil soluble. The product from reacting equivalent amounts of 4-butyl-N-ethylaniline, carbon disulfide, and octylene oxide has a total of 15 aliphatic carbon atoms, etc. Particularly preferred compositions for use as lubricant additives are those prepared from amines having from about 8 to about 40 aliphatic carbon atoms and from epoxides having from 2 to about 18 aliphatic carbon atoms.

The lubricating oils in which the products of the process of this invention are useful as additives may be of mineral, animal, vegetable, or synthetic origin. Oridinarily mineral lubricating oils are preferred by reason of their availability, general excellence, and low cost. For certain applications, oils belonging to one of the other three groups may be preferred. For instance, synthetic polyester oils such as dioctyl adipate and di-2-ethylhexyl sebacate are often preferred as jet engine lubricants. Normally the preferred lubricating oils are fluid oils ranging in viscosity from about 40 SUS (Saybolt Universal Seconds) at 100° F. to about 500 SUS at 210° F.

The concentration of the nitrogen- and sulfur-containing or in addition oxygen containing compositions of this invention to be used as a lubricant additive depends primarily upon the type of oil used and the nature of the service to which the lubricant is to be subjected. In most instances the concentration will range from about 0.1% to about 10% by weight of the additive in a lubricant. More often the concentration will range from about 0.5% to about 5% by weight of the additive.

Other additives may also be used in a lubricant composition in conjunction with the nitrogen- and sulfur-containing or in addition oxygen containing compositions of this invention. Such other additives include detergents of both ashless and ash-containing types, corrosion-inhibiting agents, rust-inhibiting additives, pour point depressants, viscosity index improving agents, oxidation inhibiting agents, anti-foaming agents, etc.

A specific utility of the compositions of this invention is illustrated by their use as lubricant additives to impart load carrying properties to lubricants. Their effectiveness in this regard is shown by the Timken OK Load Test (ASTM Bulletin No. 181, Apr. 1, 1952). The test consists in measuring the load at which rupture of a film of the lubricant between a rotating cup and a stationary block occurs as shown by the surface distress (e.g., scoring or abrasion) of the stationary block. Thus, the higher the load, the better the load carrying properties of the lubricant. By this test, an SAE 90 mineral oil gear lubricant containing 3.41% by weight of the product of Example 1 gives a result of 30 pounds, and the same SAE 90 mineral gear lubricant containing 2.15% by weight of the product of Example 5 gives a result of 45 pounds, whereas the SAE 90 mineral base oil alone gives a result of 5 pounds.

What is claimed is:

1. The process of preparing nitrogen-, sulfur- or in addition oxygen containing compositions comprising mixing (A) a compound selected from the class consisting of ammonia, primary amines, and seconary amines, excluding heterocyclic amines, (B) carbon disulfide and (C) an epoxide or thioepoxide, and reacting, at a temperature of from about −50° C. to about 100° C., (A), (B) and (C) in the following ratio: one equivalent of (A) to about one equivalent of (B) and at least about one equivalent of (C).

2. The product of the process of claim 1.

3. The process of claim 1 wherein the amine is an alkyl primary amine.

4. The process of claim 1 wherein the amine is a dialkyl amine.

5. The process of claim 1 wherein the amine is an aryl amine.

6. The process of claim 1 wherein the amine is an N-alkyl aryl amine.

7. The process of claim 1 wherein the epoxide is an alkylene oxide having from 2 to about 20 carbon atoms.

8. The process of preparing nitrogen-, sulfur- and oxygen-containing compositions comprising mixing (A) a di-alkyl amine having up to about 30 carbon atoms in each alkyl group, (B) carbon disulfide and (C) an alkylene oxide having from 2 to about 20 carbon atoms, and reacting, at a temperature of from about −50° C. to about 100° C. (A), (B) and (C) in the following ratio: one equivalent of (A) to about one equivalent of (B) and at least about one equivalent of (C).

9. The product of the process of claim 8.

10. The process of claim 8 wherein the di-alkyl amine is a dibutylamine.

11. The process of claim 8 wherein the di-alkyl amine is a dipentylamine.

12. The process of claim 8 wherein the alkylene oxide is ethylene oxide.

13. The process of claim 8 wherein the alkylene oxide is a propylene oxide.

14. The process of preparing a nitrogen-, sulfur-, and oxygen-containing composition comprising mixing (A) n-octyl-amine, (B) carbon disulfide and (C) propylene oxide, and reacting, at a temperature of from about 0° C. to about 75° C., (A), (B) and (C) in the following ratio: one equivalent of (A) to about one equivalent of (B) and at least one equivalent of (C).

15. The process of preparing a nitrogen-, sulfur- and oxygen-containing composition comprising mixing (A) a dibutyl amine, (B) carbon dislufide and (C) propylene oxide, and reacting, at a temperature of from about 0° C. to about 75° C., (A), (B) and (C) in the following ratio: one equivalent of (A) to about one equivalent of (B) and at least about one equivalent of (C).

References Cited

Durden et al.: "J. Amer. Chem. Soc.," vol. 82 (1960), pp. 3082–84.

CHARLES B. PARKER, Primary Examiner

D. R. PHILLIPS, Assistant Examiner

U.S. Cl. X.R.

252—47, 47.5, 402; 260—128, 796, 802, 999